United States Patent [19]
Abiven et al.

[11] Patent Number: 4,502,349
[45] Date of Patent: Mar. 5, 1985

[54] METHOD OF REALIZATION OF HIGH SPEED ROTOR AND ROTOR OBTAINED THEREBY

[75] Inventors: Henri Abiven, Oinville, Meulan; André Beheydt, Jouy en Josas; Michel Clermont, Guernes; Maurice Delattre, Paris; Pierre Poubeau, Le Peco, all of France

[73] Assignee: Societe Nationale Industrielle Aerospatiale, Paris, France

[21] Appl. No.: 367,124

[22] Filed: Apr. 9, 1982

[30] Foreign Application Priority Data

Apr. 14, 1981 [FR] France .................. 81 07465

[51] Int. Cl.³ ............................................. G05G 1/00
[52] U.S. Cl. ......................................... 74/572; 74/573 R
[58] Field of Search ............................ 74/572, 573 R; 29/159.03

[56] References Cited

U.S. PATENT DOCUMENTS

| 3,349,640 | 10/1967 | Schneiter | 74/573 |
| 3,964,341 | 6/1976 | Rabenhorst | 74/572 |
| 4,036,080 | 7/1977 | Friedericy et al. | 74/572 |
| 4,263,819 | 4/1981 | Poubeau | 74/573 R |

Primary Examiner—James A. Leppink
Assistant Examiner—Frank H. McKenzie, Jr.
Attorney, Agent, or Firm—Karl W. Flocks; Sheridan Neimark; A. Fred Starobin

[57] ABSTRACT

A high speed rotor for use with a flywheel comprising a hub, a rim centered with respect to said hub, connecting arms, each in the form of an elongated loop connecting said rim to said hub. The inner end of each loop is centered and maintained against the centrifugal force through a central member belonging to the hub while the outer end of said loop is bearing against the rim, a mass included within said outer end providing elongation of the loop under the effect of centrifugal force to ensure constant contact between said connecting arms and said rim.

13 Claims, 18 Drawing Figures

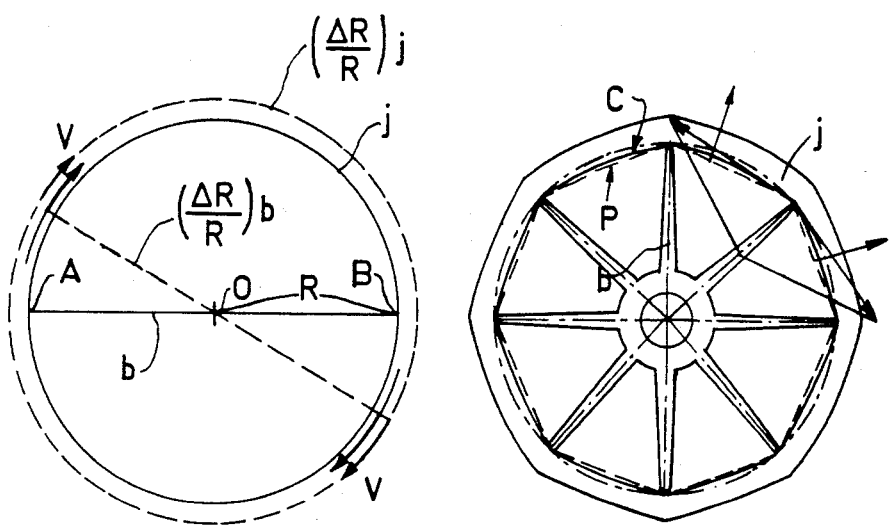
FIG.1
(PRIOR ART)
FIG.2
(PRIOR ART)
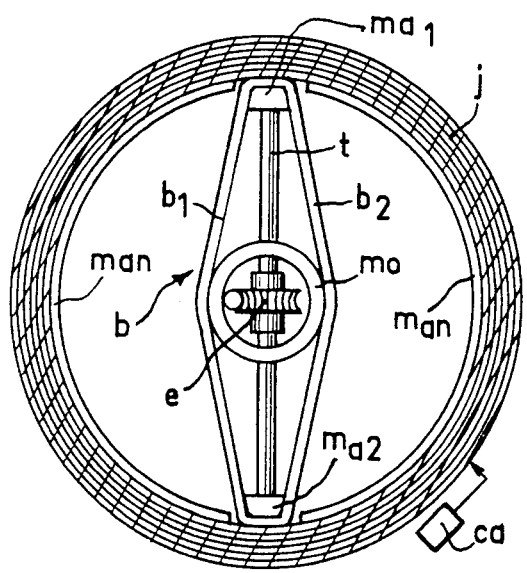
FIG.3
(PRIOR ART)

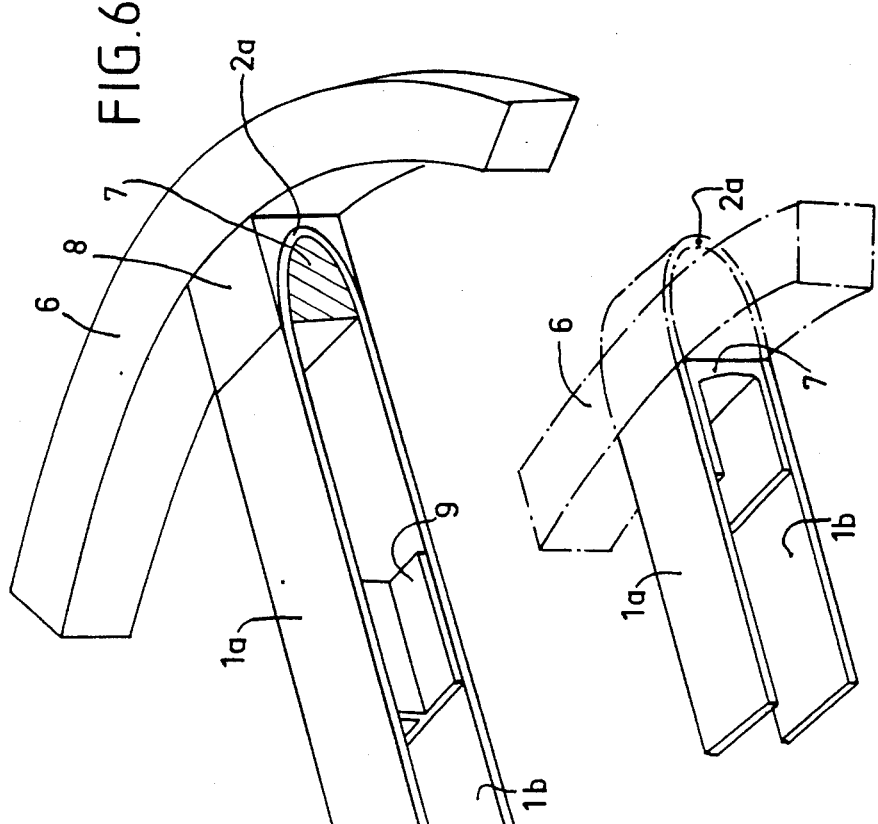

METHOD OF REALIZATION OF HIGH SPEED ROTOR AND ROTOR OBTAINED THEREBY

Numerous applications of high rotational speed rotors are known. One of the possible applications is that of flywheels capable of storing energy in kinetic form and returning it in mechanical form.

Before going further in the description of this invention, one of the basic theoretical problems raised by the structure of rotors will be first recalled very succinctly by referring to FIG. 1.

To this end, there will be considered a thin rim j of radius R centered in O and a connecting rod b of length 2R also centered in O and on which the rim j rests in the stopping position. Assuming that rim j and rod b are made of materials having the same specific mass and the same elasticity module E, if the elongation of rim j and of rod b are observed at equal rotational speeds implying the same peripheral speed V for the rim and for the ends A and B of the connecting rod, it can be seen that:

(a) the stress in the rim j is $\sigma_1 = \rho V^2$, and the corresponding elongation is:

$$\left(\frac{\Delta R}{R}\right) j = \frac{\rho}{E} \cdot V^2$$

(b) the stress in the rod b which is equal to zero at points A and B, increases up to a maximum in the center O the value of which is: $\sigma_2 = \frac{1}{2}\rho V^2$ and that the corresponding elongation over the length of a radius is:

$$\left(\frac{\Delta R}{R}\right) b = \frac{1}{3} \cdot \frac{\rho}{E} \cdot V^2$$

Upon comparison of the above relations concerning the elongations, it is observed that elongation in the rod is the third of the elongation in the rim and that consequently, the rim j cannot be centered by the rod b without the obligatory introduction of connections at points A and B, said connections themselves introducing stresses to provide coincidence of the contacting points between rod and rim.

The Applicant has devised a technology which evolved during the developments, in order to try to solve definitely the problem related to the basic structure of the high rotational speed rotors, more particularly those intended for use as flywheels in energy storage and recovery applications.

The Applicant first disclosed for the first time subcircular rotors in French Pat. No. 70 08394 of Mar. 9, 1970. It will be reminded briefly that the subcircular design is based on the following principle: the elongation of the rim j (please refer to FIG. 2) corresponds to a change in the form rather than to an increase in diameter, from the initial pseudo-polygonal shape P at rest, to the external circle C having a radius equal to that of the supporting buckles b of the rim. Thus, the rim can be made of a material having greater relative elongation than that acceptable for the arms either due to their module or their shape. Moreover, by altering the form of the rim during its positioning on the arms, the stress applied by the rim onto the arms can be adjusted. The stress depends among other parameters on the form of the rim being positioned on the arms. There results residual subcircularity at the maximum speed upon which the compression level on the arm depends, as appears moreover from studying the diagram of FIG. 2. Such compression of the rim upon the arms increases securement thereof already realized for example by glueing.

It is to be noted that such solution applied to rims of small diameters is still valid with relatively small thicknesses in the order of 10% of the radius. On the other hand, with thicker rims and rotors having a larger diameter the rim has to be dissociated into several layers, with or without intermediary wedges. With this technology it is difficult to maintain the rotor well balanced in the whole of the speed range in view of accumulation of the mechanical assembling tolerances for constituting composite material rims. Moreover, the complexity of the assembly significantly increases the development and manufacturing costs.

In their U.S. Pat. No. 4,263,819, the Applicants have presented a different solution making use of the inertial effects of an additional mass permitting elongation of the arms in such way that it be compatible with that of an initially circular rim.

The basic principle of said solution is schematized in FIG. 3 which again shows the combination of a rim j, a hub $m_o$ and at least one connecting arm b having two branches $b_1, b_2$ surrounding said hub. Masses $ma_1$ and $ma_2$ are located at the end of arm b so that during the rotation they realized securement of the arm to the rim through pressure on the one hand, and on the other hand, securement of the arm to the hub through exertion of pulling force upon the branches. Anisotropic masses $ma_n$ distributed between the arms maintains circularity of the rim constant. Static and dynamic balance is ensured by the action of electro-mechanical means e and t acting differentially upon the localized masses $ma_1$, $ma_2$ from sensors $c_a$.

This solution presents several difficulties in application among which the following can be mentioned:

the arm centering accuracy and stability level is hardly compatible with the requirement for good equilibrium by glueing.

it is not possible to find compensation for dissymmetry in both half-arms resulting from dispersion in the characteristics of the materials.

the connection between the arms and the central hub through glueing and the shape of the arms itself is not well adapted to the passage of relatively high torques due to the so-called peeling effect.

In their U.S. patent application Ser. No. 153,397 filed May 27, 1980 now abandoned, the Applicants have presented a different solution for the realization of a rotor of the subcircular type having a hub, a web and a rim. It will be reminded briefly with reference to FIG. 4 that such a solution consists of reducing radial stresses in webs b by dissociating the hub $m_o$-web b system receiving as a support the wall of the subcircular rim j resting thereon, then confining the main mass $m_a$ of said web toward the rim, such that the centrifugal force f resulting therefrom is deducted from the radial compression force F directed to the rotational axis thereby permitting reduction of the compression forces exerted upon each web.

Here again the rotor can be balanced by exerting a differential action by means of an electro-mechanical system e, t, based on information from sensors $c_a$.

Such solution also presents difficulties in application inherent with the above-mentioned rims of the subcircular type.

This invention relates to a method of manufacturing a high speed rotor more particularly applicable to a flywheel, said method constituting an improved synthesis of the Applicant's prior systems as mentioned above. Said method not only permits to eliminate disadvantages inherent with each of the prior systems, taken alone, but also affords significant advantages which will appear during the course of the detailed description of the invention which follows hereinafter.

The invention also relates to high speed rotors more particularly applicable to flywheels made in accordance with the method of this invention. The method in accordance with this invention substantially consists of realizing the centering of a rim in respect to the hub by means of a certain number of connecting arms each being in form of an elongated loop the two sides of which comprise rectilinear portions, with the inner end of said loop being centered and maintained against the centrifugal force through a central element integral with the hub, while the outer end of said loop constantly bears against the rim to which it is assembled, preferably, by glueing, a mass being included within said outer end of the loop to provoke the desired elongation of the loop under the effect of the centrifugal force and ensure constant contact between the arm and the rim.

According to a particularly advantageous characteristic of the invention, the connecting arms are made by winding on an adaptive mandrel composite filamentary materials such as glass, carbon, polymer, boron, steel fibers or the like.

It appears now that such type of rim centering with respect to the hub permits to match the pairs of opposite arms to have exactly the same mass and elongation characteristics. Therefore, it becomes possible actually to maintain dynamic balance of the rotor in the whole of the rotational speed range from the zero speed to the maximum speed, which was not possible with the prior systems. Moreover, fixation of the arms to the hub results in much better accuracy.

It will be understood that the end mass of the arms is sized in such way that the end of the arm on the rim side always rests on the rim thereby resulting in subcircularity of the rim during rotation which reinforces the securement of the arms to the rim, while maintaining the advantage of having the arms constantly under tension.

Other characteristics, advantages and specificities of this invention will appear from the following description made in reference to the attached drawings which schematically show different exemplifying forms of embodiment of the invention.

As explained in the introduction, in the drawings:

FIG. 1 is an explanative diagram of the basic problems raised by the structure of the high speed rotors, while:

FIGS. 2, 3 and 4 are explanative diagrams to show the evolution of the state of the prior art as worked out by the Applicant to solve part of the mentioned problems related to the high speed rotors; moreover:

FIGS. 5 and 6 are perspective views showing two possible forms of embodiment of the basic principle of an assembly of arms, rim and hub, the constitutive elements of which are combined in accordance with the present invention;

FIG. 7 is a detailed perspective view showing that portion of the continuous central crown belonging to the hub, which must be used as a support for the end of the arm, in the form of embodiment of FIG. 6;

FIG. 8 is a detailed perspective view of an alternative form of embodiment of the junction between the end of the arm and the rim;

Generally, in the solution according to the invention, the connection between the rim and the hub is realized by means of arms or spokes made in accordance with the method explained hereinafter from the main non exclusive use of composite filamentary materials.

Figure 4:
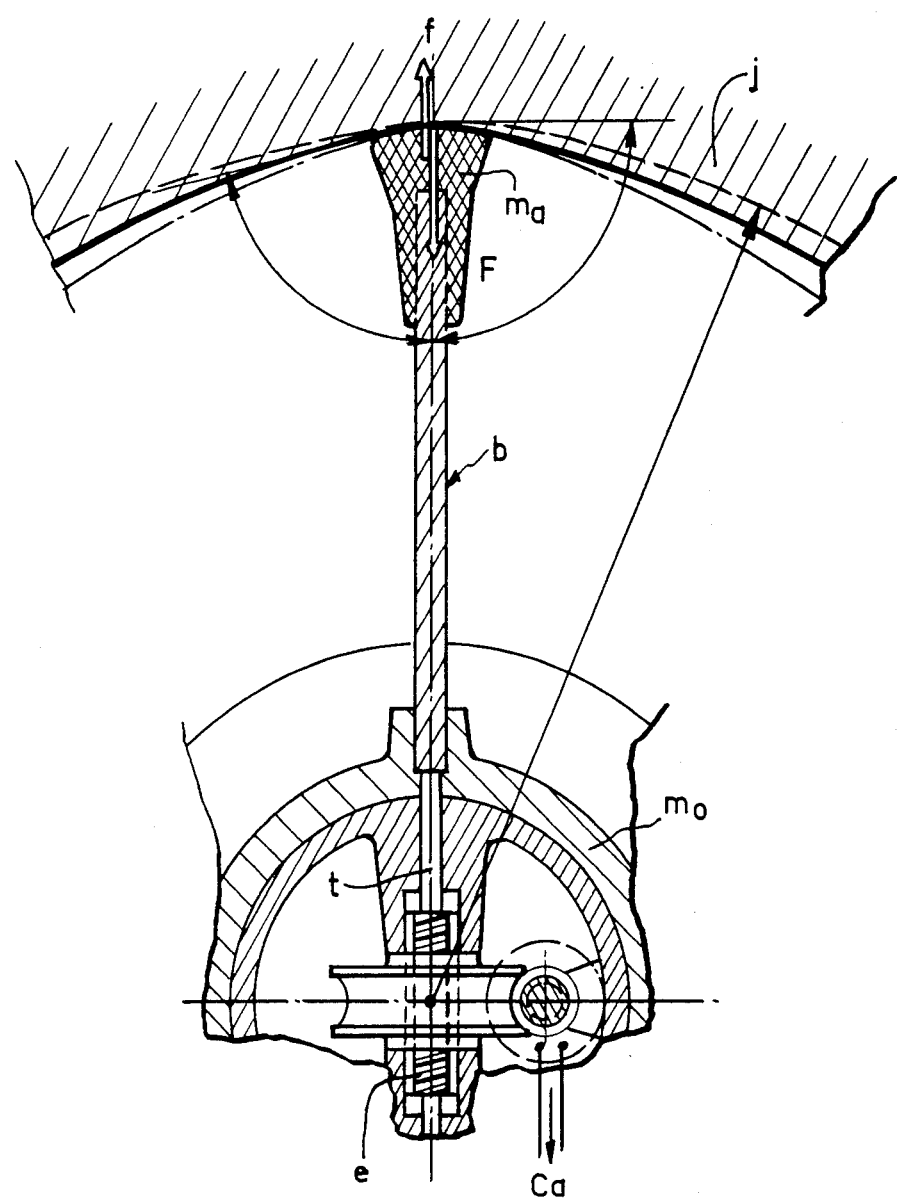
Figure 5:
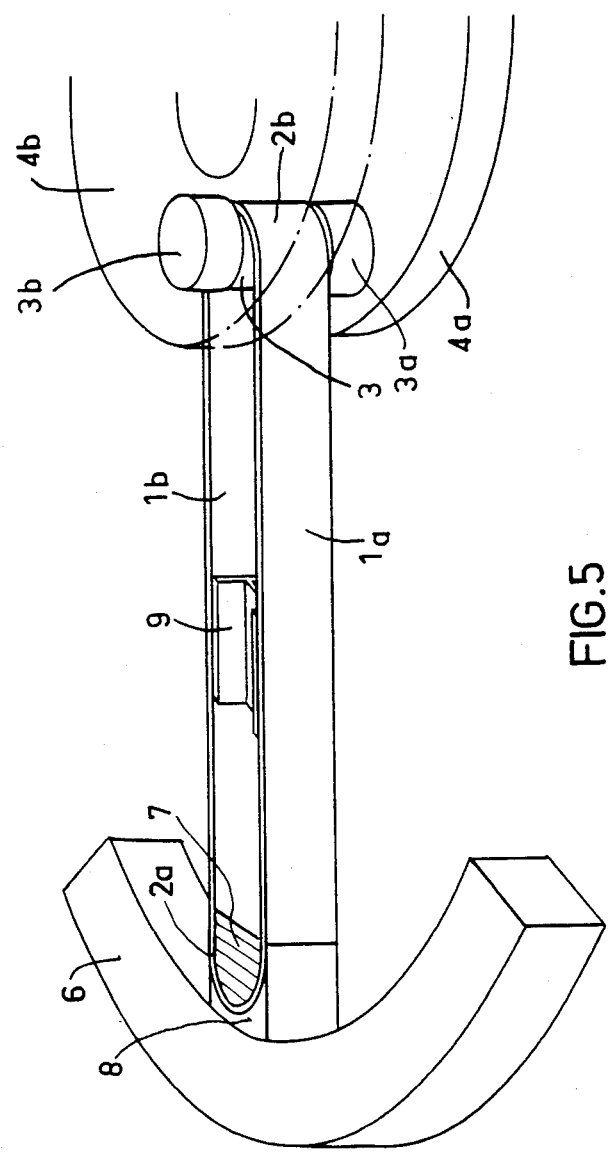

In particular, as appears from FIGS. 5, 6 and 7, each arm is constituted by winding on an adaptive mandrel, composite filamentary materials such as glass, carbon, polymer, boron, steel fibers and the like thereby making said arm in the general form of an elongated loop both sides of which have rectilinear portions.

In other words, the arm consists of two thin plates 1a and 1b connected at their ends by rounded up elements 2a and 2b, it being noted that said rounded elements can be circular but may also advantageously have an optimized elongated shape the so-called Cornu shape to improve distribution of mechanical stresses in the connection zones between the arm and the part engaged therewith.

Comparison of FIGS. 5 and 6 shows that the median plane of longitudinal symmetry of the arms can either contain the rotational axis of the rotor (FIG. 5) or be perpendicular to such rotational axis (FIG. 6).

In the case of FIG. 5, the elongated end 2b of each arm on the side of the center of the flywheel comes to rest on an adaptive part 3 parallel to the rotational axis of the assembly and secured on either part of the arm through both of its ends 3a and 3b into two disks 4a and 4b constituting a portion of the hub. Such fixation assembly is obviously dimensioned to be able to resist centrifugal force applied to the arm and in its central portion comprises a supporting surface complementary to the end 2b of the arm.

In the event that the plane of the arm should be perpendicular to the axis shown in FIG. 6, the end 2b of each arm on the side of the center of the flywheel comes to rest on a circular crown 5 maintaining the assembly of the arms against the centrifugal force which urges and centers them, said circular crown constituting a portion of the hub of the flywheel. A connection between the arms and the crown is advantageously realized by glueing.

To avoid the necessity of providing at the end 2b of the arm a supplementary part for accommodating the form of the arm at said end to support it on a circular crown, the form of embodiment shown in FIG. 7 can advantageously be adopted. Accordingly, the circular crown 5 comprises bearings 5a accurately machined to the internal supporting shape of the end 2b of the arm in the areas where the different arms will come to bear.

In both forms of embodiment of FIGS. 5 and 6, each arm receives at the level of the end 2a on the side of the rim 6, an inner part 7 having a mass defined so as to cause elongation of the arm adapted to that of the rim 6, on the one hand, and on the other hand, a second outer part 8 adapted to provide accommodation of the shapes permitting connection by glueing with the rim 6.

In both forms of embodiment of FIGS. 5 and 6, each of the arms may advantageously be completed with straighteners such as that shown at 9, which are intended for increasing rigidity of the fixation of the rim with respect to the hub either in torque, if the form of embodiment of FIG. 5 is used, or in the axial direction, when the form of embodiment of FIG. 6 is applied.

In the form of embodiment of FIG. 6, it is significant to note that the consequences mentioned hereinafter result from the fact that the arm can be opened or not at one of its ends and more particularly at the end on the side of the rim.

When the end of the arm can be opened, in particular, on the side of the rim, a continuous, central, circular crown 5 can be used on the one hand, and on the other hand, the rounded end 2a can be completely truncated and the inner part 7 can be made directly bear against the rim 6 as shown in FIG. 8. Such realization permits to dispense with the second adaptive part 8 and obtain perfect connection by glueing between the arm and the rim.

On the other hand, when the arm cannot be opened at one end due to mechanical stress levels, the form of embodiment of FIG. 8 can obviously not be adopted, and moreover, the central fixation crown must then be able to open for the mounting of the arms.

Figure 9:
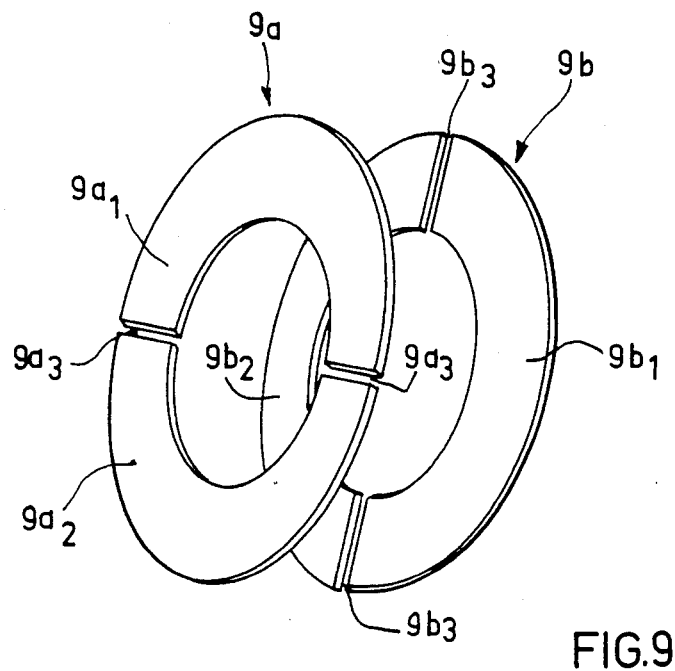
FIGS. 9 and 10 are perspective views showing another possible alternative form of embodiment of the central crown belonging to the hub, during the mounting thereof, and after completion, respectively, said crown being usable when the arm cannot be opened at one of its ends for reasons of mechanical stress levels.
Figure 10:
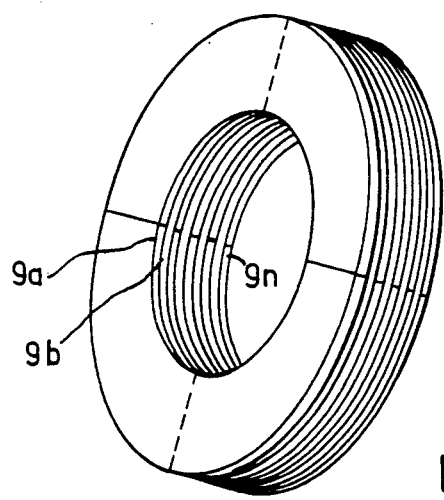

To this end, the form of embodiment schematized in FIGS. 9 and 10 can then be advantageously applied. In such a case, the central fixation crown consists of a suitable number of elementary thin crowns $9a, 9b \ldots 9n$, joined to one another by glueing. Moreover, each of the elementary crowns is constituted by two thin, half-sectors $9a_1, 9a_2,$ for the elementary crown 9a, and $9b_1, 9b_2$ for the elementary crown 9b. Said half sectors constituting an elementary crown are assembled by glueing, it being noted that the glueing lines $9a_3$, for the elementary crown 9a, and the glueing lines $9b_3$ of the elementary crown 9b, are offset by 90° from one another, when the elementary crowns 9a and 9b are assembled together by glueing, and so on, up to the assembling of the elementary crown 9n.

The number of arms can be adapted to each definitive configuration of the high speed rotor. Thus, if the rim is high enough at least two arm assemblies, one at each end of the rim, or even a greater number of arm assemblies will have to be used depending on the height of said rim.

Figure 11:
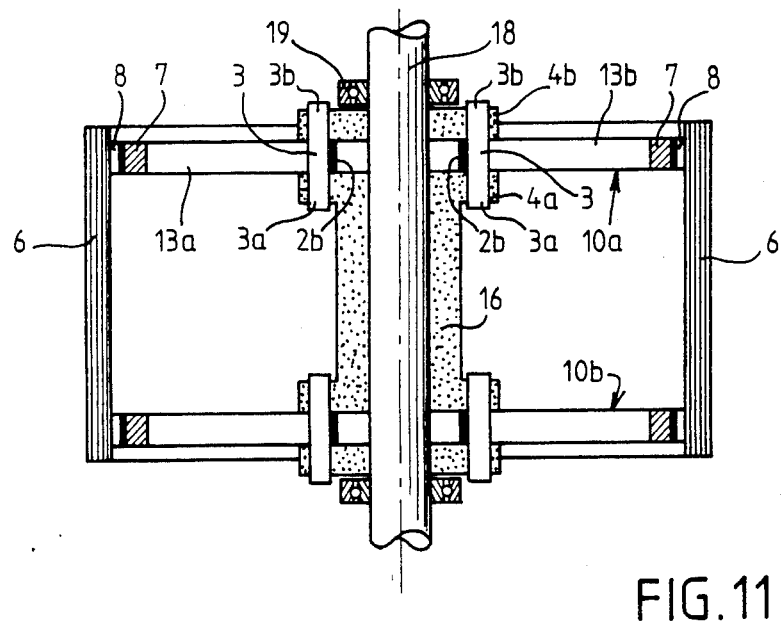
FIG. 11 is an axial longitudinal cross-sectional view of a rotor assembly in accordance with this invention.
Figure 12:
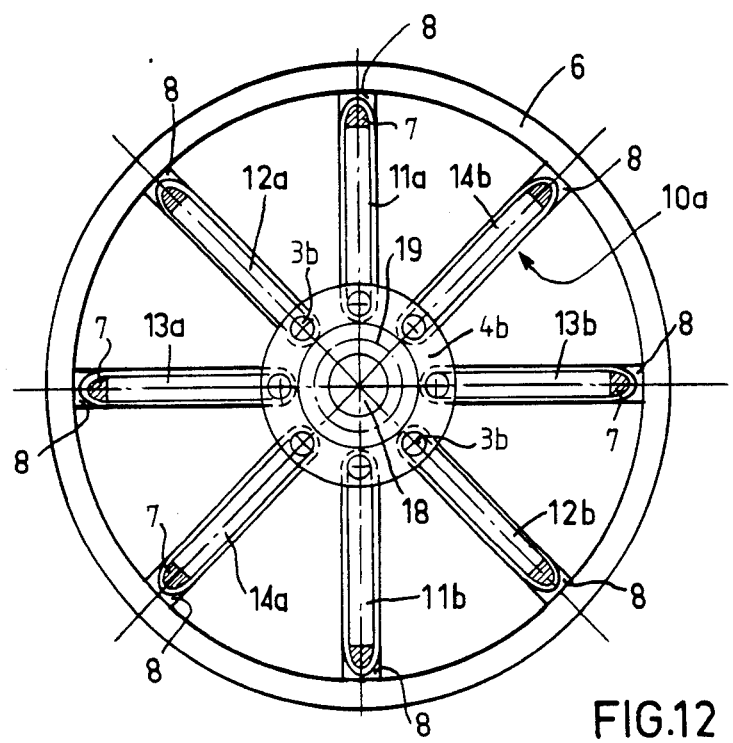
FIG. 12 is a top view thereof.

There has been shown in FIGS. 11 and 12, as a non limitative example, how a high speed rotor for flywheel in accordance with this invention can be realized.

The height of the rim 6 requires in this occurrence the use of two assemblies of arms 10a and 10b mounted at both ends of said rim. Each assembly consists of eight arms matched by pairs of opposite arms 11a, 11b, 12a, 12b, 13a, 13b and 14a, 14b. Each of those arms is of the type of FIG. 5 and the central crown consists of two disks, 4a and 4b joined to one another by adaptive parts 3, 3a, 3b on which the inner ends 2b of the arms bear. The inner disk 4a belongs to the hub 16. The central shaft 18 is rotatable and joined to said hub 16. Rollings 19 are used for mounting the assembly in a frame as shown in detail hereinafter.

Figure 13:
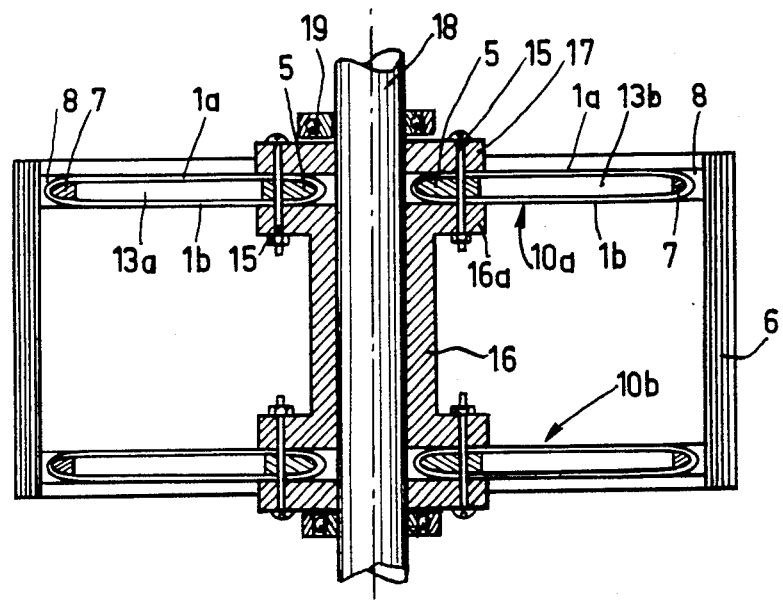
FIG. 13 is an axial longitudinal cross-sectional view of an alternative form of embodiment of a rotor assembly in accordance with the invention.

Furthermore, it will be understood that arms of the type shown in FIG. 6 may be also used as is schematically shown in the exemplifying form of embodiment of FIG. 13.

In this case, the central circular fixation crown 5 is continuous. Such crown which belongs to the hub is secured by connecting means 15 between the shoulder 16a of the central part of the hub 16 and an outer crown 17. The central shaft 18 is again joined to the hub 16 and rollings 19 permit the assembly to be mounted in a frame.

Figure 14:
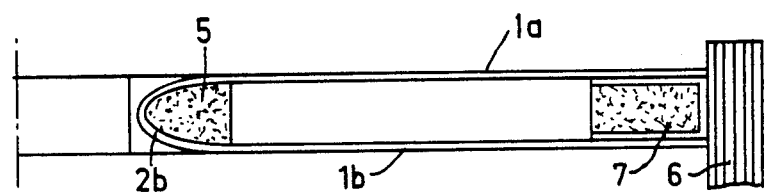
FIG. 14 is a detailed view showing in an axial longitudinal cross-section an alternative form of embodiment of the invention in which materials are advantageously used having longitudinal elasticity modules E and specific masses $p$ resulting in differing values of the ratio $E/p$ for the arm, on the one hand, and on the other hand, for the rim.

Arms of the type shown in FIG. 8 might also be used. Thus, the characteristics of the invention according to which composite filamentary materials are used for manufacturing the arms can advantageously be put into practice. In this event, there can be advantageously employed the form of embodiment shown in FIG. 14 in which the end of the arm on the rim side is directly glued against the rim and materials are advantageously used, having longitudinal elasticity modules E and specific masses $\rho$ resulting in differing values of the ratio $E/\rho$, for the arms on the one hand, and on the other hand, for the rim.

Figure 15:
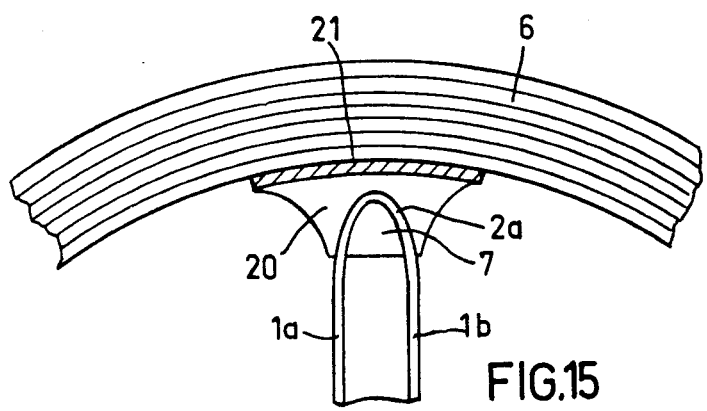
FIG. 15 is a detailed view showing another alternative form of embodiment in which the end of the arm comes to bear against the rim through a material permitting to provide compatibility of the connection between the rim which undergoes significant circumferential elongation and the end piece of the arm.

To ensure compatible connection between the rim which is submitted to significant circumferential elongation and the end piece of the arm, one can advantageously adopt the form of embodiment shown in FIG. 15.

In this case, the arm is for example of the type shown in FIG. 5 in which the adaptive part 8 is replaced by a part 20 encompassing the end 2a of the arm containing the inner mass 7, such part 20 being provided at its end engaged with the rim 6 with a plate 21 made from a material having such elongation characteristics that on the one side it can remain joined with the part 20 without tangential elongation at the level of such contact, and on the other side it can remain joined with the rim while coping with its tangential elongation, whatever be such elongation, in the whole range of speeds. The plate 21 may be made from a resin or an elastomer advantageously reinforced with glass, carbon, polymer fibers and so on. The plate 21 is thus glued on one side to the part 20, and on the other side to the rim 6. In another form of embodiment, not shown, the part 20 can be provided at its end with a piling up of thin sheets of material that can be submitted to significant elongation such as "Mylar", "Kapton", or the like, self-adhesive, on both faces, or with glueing of the sheets to one another and to the rim and the part 20.

It has been described above with reference to FIGS. 11, 12 and 13, how a high speed rotor assembly, in particular, for flywheel, could be realized according to the invention.

It will now be described succinctly with reference to the very schematical FIGS. 16, 17 and 18 three possible forms of embodiment for the mounting of a rotor in accordance with the invention, denoted by the general reference letter R in respect to a frame in form of a housing denoted by the general reference letter B, by means of mechanical bearings, for example, roll bearings or the like.

It will be understood that the problem would be roughly the same by replacing the mechanical bearings in question by magnetic bearings, save for electro-magnetic adaptive means involved with said magnetic bearings.

Figure 16:
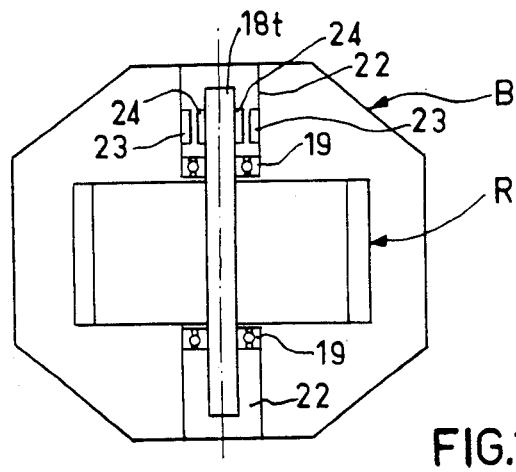
FIGS. 16, 17 and 18 are explanative diagrams showing three possible methods of mounting a rotor in accordance with the invention, in respect to the frame, for example by means of ball rollings or other types of bearings.
Figure 18:
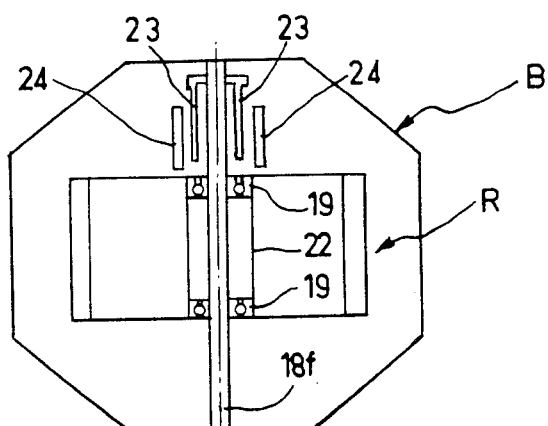
Figure 17:
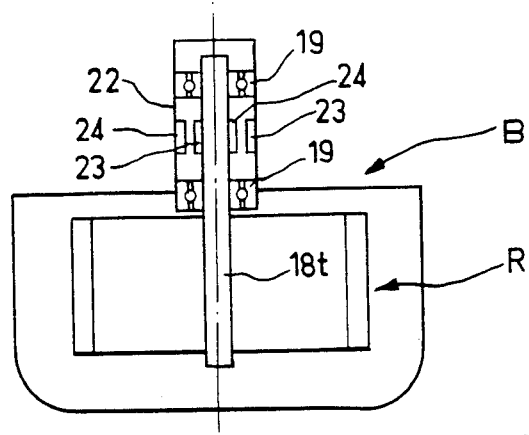

Apart from this, it can be noted that there are two types of suspension, namely the suspension with the central rotatable shaft 18t of FIGS. 16 and 17, and the suspension with central stationary shaft 18f of FIG. 18.

In the case of FIG. 16, the central shaft 18t joined to the hub of rotor R is mounted on either side of said rotor in movable elements of two rollings 19 the stationary elements of which are joined to two cylinders 22 constituting the frame.

It will be understood that at least one of the cylinders 22, for example, the upper one, is used as a housing for the electrical motor generator, of any known type, the electro-magnetic stationary elements 23 of which are joined to the cylinder 22 while its electro-magnetic movable elements 24 are joined to the central rotatable shaft 18t.

According to an alternative form of embodiment, there can obviously be disposed a motor in the upper cylinder and a generator in the lower cylinder.

Without going into unnecessary details which do not belong to the invention, it might be briefly recalled that the motor permits to drive the rotor forming a flywheel at a high speed to store energy under kinetic form. Such energy is recovered in electric form through the generator or even under mechanical form by the rotatable shaft driven by the rotor by its kinetic energy.

According to a further alternative form of embodiment shown in FIG. 17, the central rotatable shaft 18t to which the rotor R is keyed to form a flywheel is supported in cantilever by two rollings 19 mounted on both ends of a cylinder 22 disposed at the upper portion of the frame. It will be understood that an electrical motor generator 23-24 is mounted in said cylinder 22 and that the assembly is operated in the same way as the form of embodiment previously described in reference to FIG. 16.

In the case of FIG. 18, the suspension has a central stationary shaft 18t.

In such a form of embodiment, the shaft 18f is fixed at both ends in the center line of frame B while the rotor R is joined to a central cylinder 22 itself joined to movable elements of rollings 19 having fixed elements joined to the central stationary shaft 18f.

In this case the electro-magnetic stationary elements 23 of the motor-generator are of course joined to the central stationary shaft 18t, whereas the electro-magnetic movable elements 24 of such motor are joined to the rotor R.

The assembly of FIG. 18 is operated in exactly the same way as the previously described one.

It will be understood that this invention was only described and represented in reference to preferential forms of embodiment and that technical equivalent parts can be substituted for its constitutive elements without departing from its scope as defined in the attached claims.

We claim:

1. A high speed rotor of a type applicable for use with a flywheel comprising a hub having an axis for rotation therearound, a rim centered with respect to said hub and having an inner side, pairs of opposite connecting arms with identical elongation characteristics each in the form of an elongated loop connecting said rim to said hub and centering said rim with respect to said hub, said arms glued to said rim at the inner side thereof, said arms each having rectilinear portions forming sides of each said loop and having an inner end connected to said hub and an outer end connected to said rim, a pair of identical masses included within said loops at said outer ends of opposite arms in each pair of opposite arms to provide elongation of rectilinear portions of said loop under the effect of centrifugal force compatible with increase in radius of said rim when said rotor is rotated to ensure that said arms keep being pressed against inner side of said rim, said hub having central circular means to center and maintain each said loop against centrifugal force with each said loop connected to said central circular means, said rectilinear portions of said loops being thin plates, and each of said loops including said thin plates joined at least at their ends near said hub through a rounded element of elongated form on at least inner end of said arm, said arm having a longitudinal symmetrical plane containing the rotational axis of said hub.

2. The high speed rotor of claim 1, further characterized by said connecting arms formed of wound composite filamentary materials from the group of materials including glass, carbon, polymer, boron and steel fibers.

3. The high speed rotor of claims 1, further characterized by straighteners disposed between said thin plates.

4. The high speed rotor of claims 1 or 2, further characterized by the materials of the rotor having longitudinal elasticity modules E and specific masses $\rho$ resulting in differing values of the ratio $E/\rho$ for said arms on the one hand, and on the other hand, for said rim, to provide elongation of said arm exactly adapted to that of said rim.

5. The high speed rotor of claim 1, further characterized by an adaptive part connecting each said arm to said rim by glueing and providing support of said arm against said rim.

6. The high speed rotor of claim 1, further characterized by a second set of connecting arms substantially the same as said first mentioned connecting arms extending in a plane parallel to a plane containing said first mentioned connecting arms, said second set of connecting arms being axially spaced along said rim from said first mentioned connecting arms.

7. The high speed rotor of claim 1, further characterized by
said hub including
at least one pair of axially spaced disks perpendicular to the rotational axis of said hub,
and a plurality of adaptive pieces connected to said hub and parallel to said axis, connected to both of said disks and crossing said loop of each said connecting arms for centering and maintaining said arms against centrifugal force.

8. A high speed rotor of a type applicable for use with a flywheel comprising
a hub having an axis for rotation therearound,
a rim centered with respect to said hub and having an inner side, pairs of opposite connecting arms with identical elongation characteristics each in the form of an elongated loop connecting said rim to said hub and centering said rim with respect to said hub, said arms glued to said rim at the inner side thereof,
said arms each having rectilinear portions forming sides of each said loop and having an inner end connected to said hub and an outer end connected to said rim,
a pair of identical masses included within said loops at said outer ends of opposite arms in each pair of opposite arms to provide elongation of rectilinear portions of said loop under the effect of centrifugal force compatible with increase in radius of said rim when said rotor is rotated to ensure that said arms keep being pressed against inner side of said rim,
said hub having central circular means to center and maintain each said loop against centrifugal force with each said loop connected to said central circular means,
said rectilinear portions of said loops being thin plates, and
each of said loops including
said thin plates joined at least at their ends near said hub through a rounded element of elongated form on at least inner end of said arm, said arm having a longitudinal symmetrical plane perpendicular to the rotational axis of said hub.

9. The high speed rotor of claim 8, further characterized by
said hub including
a central circular crown
said central circular crown crossing said loop of each said connecting arm to maintain the assembly of said arms against the centrifugal force of the rotor to center said arms.

10. The high speed rotor of claim 9, further characterized by
said loop of each said connecting arm being truncated at said outer end of said arms, and
said central circular crown being a closed continuous ring,
whereby said arms may be inserted around said continuous circular crown before being glued to the rim.

11. The high speed rotor of claim 9, further characterized by
said central crown including
a pile-up of complementary thin elementary half crowns in an assembly which is glued together, and
said loops of each said connecting arm being continuous.

12. The high speed rotor of claim 8, further characterized by
an adaptive part connecting each said arm to said rim through a plate with an outer side engaged with the rim and an inner side engaged with said adaptive part, said plate being of such a material that it is able to undergo at said outer side a circumferential elongation compatible with circumferential elongation of said rim while undergoing no circumferential elongation at its inner side.

13. The high speed rotor of claim 4, further characterized by
said circular crown having machined bearings for maintaining said rounded elements of said inner end of each said arm.

* * * * *